United States Patent
Bisson

(10) Patent No.: US 9,763,846 B2
(45) Date of Patent: Sep. 19, 2017

(54) MEMORIAL OBJECT AND METHOD OF MAKING THE SAME

(71) Applicants: LES ESPACES MEMORIA INC., Outremont (CA); Diane Bisson, Montréal (BY)

(72) Inventor: Diane Bisson, Montréal (CA)

(73) Assignees: Diane Bisson, Montréal (Québec) (CA); LES ESPACES MEMORIA INC., Outremont (Québec) (CA)

( * ) Notice: Subject to any disclaimer, the term of this patent is extended or adjusted under 35 U.S.C. 154(b) by 0 days.

(21) Appl. No.: 14/920,263

(22) Filed: Oct. 22, 2015

(65) Prior Publication Data

US 2016/0250091 A1    Sep. 1, 2016

(30) Foreign Application Priority Data

Oct. 22, 2014 (CA) .................................. 2868552

(51) Int. Cl.
    *A61G 17/08* (2006.01)
    *E04H 13/00* (2006.01)

(52) U.S. Cl.
    CPC ........... *A61G 17/08* (2013.01); *E04H 13/008* (2013.01)

(58) Field of Classification Search
    CPC ........ A61G 17/08; A01N 1/00; E04H 13/008; B09B 3/00; B09B 5/00
    USPC ................................... 27/1, 21.1; 428/542.4
    See application file for complete search history.

(56) References Cited

U.S. PATENT DOCUMENTS

| | | | |
|---|---|---|---|
| 1,640,680 A * | 8/1927 | Vanderlaan | C04B 33/16 264/601 |
| 2,468,924 A | 11/1949 | Meierjohan et al. | |
| 3,408,712 A * | 11/1968 | Pauliukonis | A01N 1/00 27/22.1 |
| 4,067,091 A * | 1/1978 | Backman | A01N 1/00 27/21.1 |
| 5,016,330 A * | 5/1991 | Botsch | E04H 13/008 27/1 |
| 5,774,958 A | 7/1998 | Casimir | |
| 5,987,720 A * | 11/1999 | Yamamoto | A01N 1/00 27/1 |
| 6,170,136 B1 * | 1/2001 | Wilson-Brokl | A61G 17/08 27/1 |
| 6,200,507 B1 * | 3/2001 | Dennis | A61G 17/08 264/112 |
| 6,615,463 B1 | 9/2003 | Hojaji | |
| 7,228,602 B2 * | 6/2007 | Weisbrot | A44C 17/00 264/234 |

(Continued)

FOREIGN PATENT DOCUMENTS

KR       100729904 B1 * 6/2007

*Primary Examiner* — William Miller
(74) *Attorney, Agent, or Firm* — Baker & Hostetler LLP

(57) ABSTRACT

A memorial object including inner cremation contents, and a housing structure for housing the inner cremation contents, the housing structure being made of at least a first fluid, wherein the housing structure is maintainable in a predetermined solid shape only upon maintenance of the housing structure under a freezing temperature of the first fluid. Preferably the fluid is water. The invention provides a sustainable method of making a dissolvable memorial object or urn by transforming water into solid shape of ice encapsulating cremation ashes.

18 Claims, 8 Drawing Sheets

(56) References Cited

U.S. PATENT DOCUMENTS

| | | | |
|---|---|---|---|
| 7,266,866 B2* | 9/2007 | Vogel | B09B 3/005 |
| | | | 110/341 |
| 8,627,555 B2* | 1/2014 | Kennedy | A61G 17/08 |
| | | | 27/1 |
| 9,168,573 B2* | 10/2015 | Hojaji | B09B 3/00 |
| 2002/0025392 A1* | 2/2002 | Yardley | C03B 1/00 |
| | | | 428/3 |
| 2003/0154581 A1* | 8/2003 | Jain | A61G 17/08 |
| | | | 27/1 |
| 2009/0077779 A1 | 3/2009 | Zimmerman et al. | |
| 2009/0266108 A1* | 10/2009 | Balme | A44C 17/006 |
| | | | 63/1.11 |
| 2010/0005835 A1* | 1/2010 | Johnson, Sr. | A01K 61/002 |
| | | | 63/36 |
| 2010/0143653 A1 | 6/2010 | Cranham et al. | |
| 2010/0199476 A1* | 8/2010 | Cummings | A61G 17/08 |
| | | | 27/1 |
| 2015/0067998 A1* | 3/2015 | Tinsley | B02C 19/18 |
| | | | 27/21.1 |

* cited by examiner

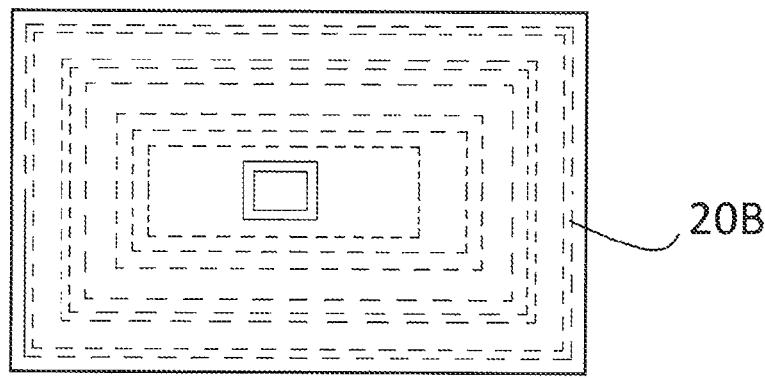
Fig. 21A
Fig. 21B
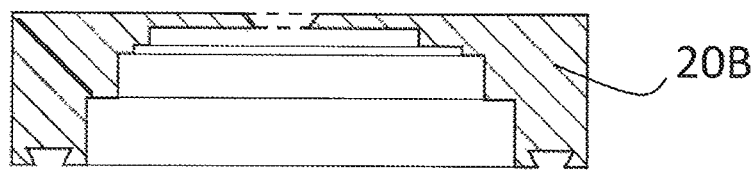
Fig. 21C
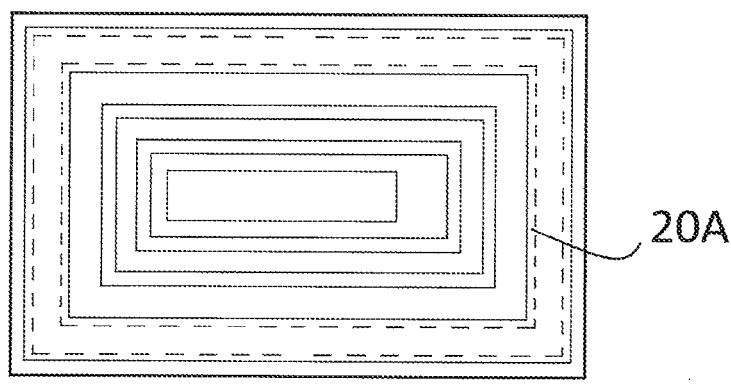
Fig. 21D
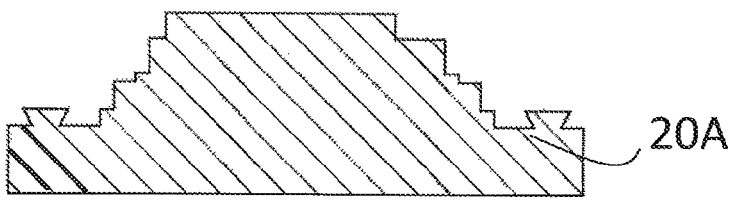
Fig. 22
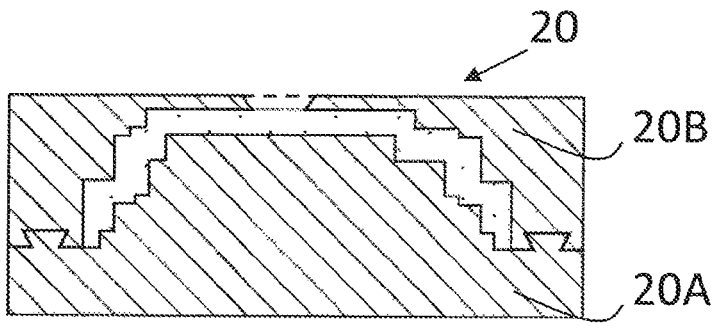

MEMORIAL OBJECT AND METHOD OF
MAKING THE SAME

FIELD OF THE INVENTION

The present invention relates to memorial objects. More particularly, the present invention relates to a dissolvable and sustainable memorial object incorporating a frozen fluid in one form or another in order to encapsulate cremation remains, as well as to a corresponding method for doing the same.

BACKGROUND OF THE INVENTION

The practice of cremation has become increasingly popular in the last few decades in many countries. Cremation was introduced in response to the ever-increasing use of land for burial, but also as a more environmentally acceptable alternative to burial showing a lower carbon footprint. Traditional burials require a large amount of resources and produce significant waste that are now known to have significant negative environmental impact. As the practice of cremation grows, a variety of creative options for how and where ashes can be scattered are being introduced in funerary ceremonies. Ashes from a cremation do not represent a health risk. They are composed of dried bone fragments that have been pulverized. They may be kept or released or scattered in a variety of ways and in many locations. It is not uncommon to see ashes scattered in forests, gardens, or onto the ground of a favorite place of the deceased. Many people disperse the ashes of their loved ones into a lake, the sea or other bodies of water.

Diverse urns have been used through time for water burials. To avoid contamination of water with non-degradable objects, water-soluble urns have recently been introduced on the market. Most are made from natural materials such as paper, natural clays, wood, and natural bonding agents. The biodegradable urns, although environmentally friendly by nature, still introduce in the water materials that do not entirely disintegrate, or materials that take many hours to break into pieces small enough that they are not avertedly eaten by marine wildlife. Paper or paper clay, for example, will take more than a few hours to decompose, sometimes days, which may also result in the urn floating or washing ashore. From a chemical viewpoint, biomaterials used may impact the pH of small bodies of water. Images or messages, often printed on the urns with substances such as water-soluble non-toxic paints, may also impact aquatic life. Environmental issues underlying methods of making water-dissolvable urns include 1) the quantity of material used for making the urn; 2) choosing or developing materials that will dissolve leaving little or no trace of waste; 3) materials that have no or little impact on the environment; and 4) choosing a low carbon footprint production process.

For example, current techniques include U.S. Pat. No. 5,774,958 A: It discloses a dissolvable urn for burial of cremated remains in water including a container having a cavity and an opening formed therein; the cavity being capable of holding cremated remains and the opening being capable of allowing cremated remains to be placed into the cavity from the outside. A lid is capable of being fixed to the container to seal the opening therein. The container and the lid comprise a material selected from the group consisting of clay; heat treated sodium bicarbonate, solid sodium chloride, solid calcium chloride and a combination thereof; the container and the lid being dissolvable within several days when immersed in water, and the urn being configured to have a specific gravity less than water so that the urn will initially float when immersed in water and dissolve while floating."

Encapsulation techniques are currently used for encapsulating ashes into solid objects made of ceramics, composites such as organic polymer matrix, metal, or glass. Another technique refers to mixing ashes with a bonding material, solidifying ashes into solid objects of diverse forms as a remembrance or to use them in a piece of jewelry. However, the final object in these cases is not designed as a sustainable product, nor as a biodegradable or water-dissolvable urn. Examples of existing techniques include patent application U.S. Pat. No. 6,615,463 which claims a method for processing cremation remains, comprising the steps of: creating a residue comprising a cremation remains; calcining the residue such that substantially all organics and carbon are removed from the residue; combining the calcined residue with an additive; and further processing the combined calcined residue and additive to form a solid product that is durable and has a predetermined shape. Patent application US20090077779 describes a memorial object formed of a concrete mix cast in a mould and comprising up to about 50% sand, up to about 25% aggregate, up to about 25% cement, up to about 60% cremation ash of a deceased, and water, wherein the percentage of at least one of sand and aggregate is reduced corresponding to the amount of the cremation ash added.

Finally, man-made reefs are also created to entrap ashes into, for example, blocks of cement or other materials. These are built as ocean-memorial reefs.

Hence, in light of the aforementioned, there is a need for a memorial object and method which, by virtue of its design and components, would be able to provide a more sustainable way of providing such a memorial object.

SUMMARY OF THE INVENTION

One object of the present invention is to provide a solution to at least one of the above-mentioned prior art drawbacks.

The present invention relates to a sustainable method of making a dissolvable memorial object or urn by transforming a liquid into a solid shape of ice encapsulating cremation ashes.

In accordance with an aspect of the present invention, there is provided a memorial object comprising:
  inner cremation contents; and
  a housing structure for housing the inner cremation contents, the housing
  structure being made of at least a first fluid,
wherein the housing structure is maintainable in a predetermined solid shape only upon maintenance of the housing structure under a freezing temperature of the first fluid.

In some implementations, the inner cremation contents comprise cremation ash.

In some implementations, the inner cremation contents is a mixture comprising:
  cremation ash; and
  a second fluid;
wherein the mixture is frozen into a second predetermined shape.

In some implementations, the second predetermined solid shape is integrally frozen with a liquid to the housing structure.

In some implementations, the first fluid comprises water.

In some implementations, the first fluid comprises a water-based liquid.

In other implementations, the fluid can be liquid $CO_2$ that is solidified and frozen.

According to the present invention, there is also provided a method of forming a memorial object, which comprises:
(a) pouring a first fluid in a first mould, said first mould being shaped in a first predetermined shape to receive cremation contents;
(b) cooling the first fluid to at least a freezing temperature of the first fluid, such that the first fluid transitions to a solid and assumes the shape of the first predetermined shape, thus forming a memorial object;
(c) maintaining the memorial object in said first predetermined solid shape by maintaining the memorial object under the freezing temperature of the first fluid.

In some implementations, the method further comprises, before step (a), the steps of:
(i) mixing a second fluid with the cremation contents to form a first cremation mixture;
(ii) pouring the first cremation mixture in a second mould to form a second predetermined shape;
(iii) cooling the first cremation mixture to at least the freezing temperature of the first cremation mixture; and
(iv) placing the frozen first cremation mixture in the first mould.

In some implementations, the method further comprises:
(d) placing the cremation contents in the first mould;
(e) pouring a second fluid over the cremation content in the first mould to form a second cremation mixture; and
(f) cooling the second cremation mixture to at least the freezing temperature of the second cremation mixture In some implementations, the method further comprises:
(g) pouring a third fluid over the second cremation mixture in the first mould;
(h) cooling the third fluid to at least the freezing temperature of the third fluid, wherein said third fluid is integrally frozen with the first fluid to the housing structure.

In some implementations, the mould comprises a two-part mould.

According to the present invention, there is also provided a method of forming a memorial object, which comprises:
(a) placing cremation contents in a mould;
(b) pouring a fluid over the cremation contents;
(c) cooling the fluid to at least a freezing temperature of the fluid, such that the fluid transitions to a solid and assumes a predetermined shape, thus forming a memorial object;
(d) maintaining the memorial object in said predetermined solid shape by maintaining the memorial object under the freezing temperature of the fluid.

In some implementations, the first, second and third fluids are the same, preferably water.

The components, advantages and other features of the invention will become more apparent upon reading of the following non-restrictive description of some optional configurations, given for the purpose of exemplification only, with reference to the accompanying drawings.

BRIEF DESCRIPTION OF THE DRAWINGS

FIG. 21A is a top schematic view of a first portion of a two-part urn mould according to an embodiment of the present invention.

FIG. 21B is a side schematic view of the first portion of the two-part urn mould shown in FIG. 21A.

FIG. 21C is a top schematic view of a second portion of a two-part urn mould according to an embodiment of the present invention.

FIG. 21D is a side schematic view of the second portion of the two-part urn mould shown in FIG. 21C.

FIG. 22 is a side cut schematic view of the assembled two-part urn mould shown in FIGS. 21A-21D with liquid poured therein.

DETAILED DESCRIPTION OF PREFERRED EMBODIMENTS OF THE INVENTION

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present invention illustrated in other figures can be easily inferred therefrom. The embodiments, geometrical configurations, materials mentioned and/or dimensions shown in the figures are optional, and are given for exemplification purposes only.

Furthermore, although the present invention may be used with various objects, such as cremation remains, for example, it is understood that it may be used with other memorial objects. For this reason, expressions such as "ashes", "urn", "mould", etc. as used herein should not be taken as to limit the scope of the present invention to these memorial objects in particular. These expressions encompass all other kinds of materials, objects and/or purposes with which the present invention could be used and may be useful, as can be easily understood.

Figure 7:
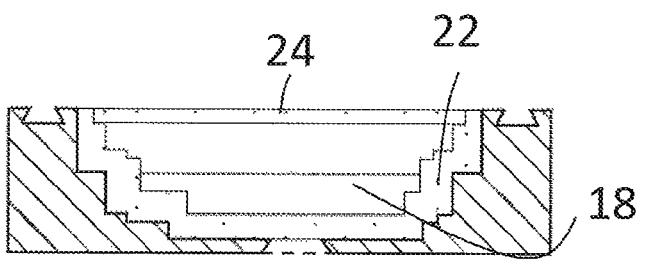
FIG. 7 is a side cut schematic view of part B of the mould shown in FIG. 3 with an ice cover placed thereon, wherein the ashes have been mixed with water.
Figure 8:
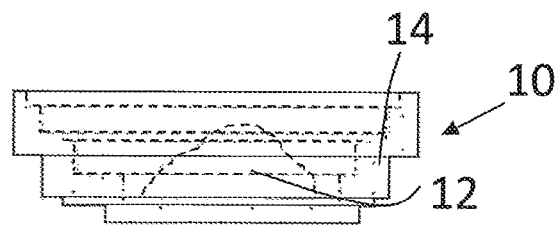
FIG. 8 is a side view of a memorial object according to an embodiment of the present invention.
Figure 15:
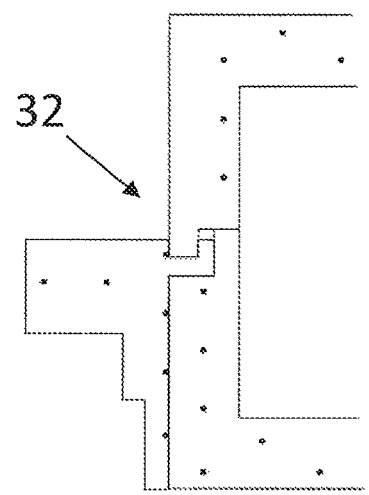
FIG. 15 is a detailed side view of a frozen liquid joint according to an embodiment.
Figure 16:
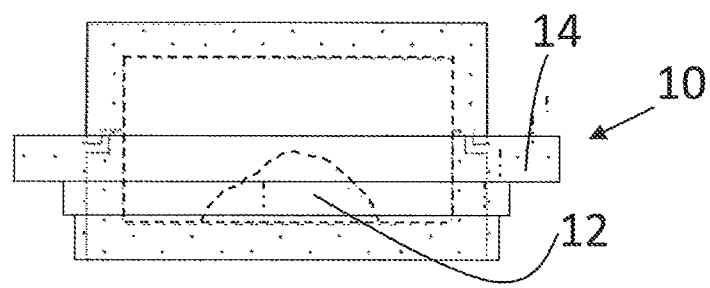
FIG. 16 is a side view of a memorial object according to another embodiment of the present invention.
Figure 23:
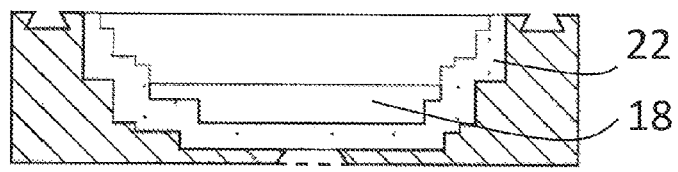
FIG. 23 is a side cut schematic view of part B of the mould shown in FIG. 22 with frozen ashes deposited therein.
Figure 24:
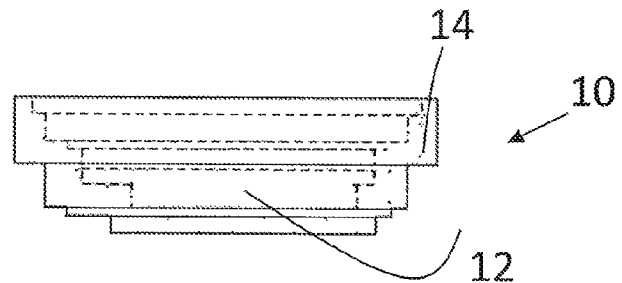
FIG. 24 is a side view of a memorial object according to another embodiment of the present invention.

As shown in FIGS. 1 to 24, more particularly in FIGS. 8, 16 and 24, there is provided a memorial object 10 including inner cremation contents 12, and a housing structure 14 for housing the inner cremation contents 12, the housing structure 14 being made of at least a first fluid, preferably water, wherein the housing structure 14 is maintainable in a predetermined solid shape only upon maintenance of the housing structure 14 under a freezing temperature of the first fluid. In some implementations, the memorial object is effectively cremation ash simply frozen in the fluid into a predetermined shape within a mould to form a monobloc, where the housing structure and inner cremation contents form an integral unit.

In some implementations, the inner cremation contents comprise cremation ash only and the housing structure is a structure of frozen fluid encapsulating the cremation ash.

Figure 20:
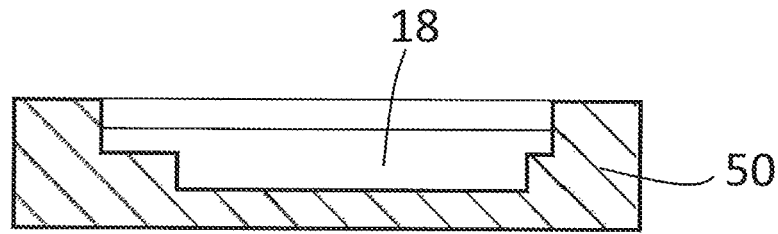
FIG. 20 is a side cut schematic view of a cremation ash mould according to an embodiment of the present invention, with liquid poured over the cremation ash.

In some implementations, the inner cremation contents 12 is a mixture comprising:
cremation ash 16; and
a second fluid;
wherein the mixture is frozen into a second predetermined shape 18, as shown in FIGS. 20 and 23.

In some implementations, the second predetermined solid shape is integrally frozen with the first fluid to the housing structure.

In some implementations, the first fluid comprises water.

In some implementations, the first fluid comprises a water-based liquid.

In other implementations, the fluid can be liquid $CO_2$ that is solidified and frozen.

The invention relates to a sustainable method of making a water-dissolvable urn by transforming a liquid into a solid shape of ice encapsulating the ashes. The invention generally relates to a method comprising the steps of: making an open ice urn using a mould; placing the ashes in a loose form or a frozen form in the open cavity, and; completing the ice urn by adding and freezing a liquid into a final predetermined closed shape.

In some implementations, the material used to make the urn is water. As such, it is a zero-waste product. It exemplifies a circular ecological approach by using water to create an urn that will return to its original state in a water environment. It minimises considerably the carbon footprint production by producing only the shaping moulds and using low-energy consumption freezing methods. This invention relates to a method of producing a water-dissolvable urn with no other materials but environmentally acceptable water, that is water that will not contain substances that may pollute the body of water in which it will be placed.

This invention also relates to the production of an urn that encapsulates the ashes so that the ashes may be scattered in the water as the urn slowly dissolves. Scattering ashes in outdoor settings can be considered a more sustainable final disposition for reducing both pollution and use of natural resources. Because of wind, ashes may however unexpectedly blow back. The ice-urn, as a cinerary container, incorporates loose ashes of frozen ashes inside a closed body of ice that prevents potential blow back while leaving no trace of waste.

Ashes Contained in the Ice Urn

Ashes are composed of the residual bones and ashes from the cremation process of deceased humans and animals. They are primarily bone fragments that are pulverized into a fine grain powder. The funerary industry is now required to dispose of metal remains that risk damaging the environment according to national environmental laws and regulation. The volume of ashes produced by the pulverization is around 220 cubic inches.

Intrinsic Characteristics of the Ice Urn i) The ice urn is designed for placement of cremated remains in water or in soil.

ii) In some implementations, the ice urn is preferably made of water frozen into a solid state. The water is free of any substances that may pollute the body of water or the soil in which it will be placed. Other fluids with equivalent or comparable properties can be used also.

iii) The ice urn may be of varied shapes. Because ice is less dense than liquid water, many shapes of ice cinerary urns will float on water.

iv) Rather than sinking like most water-soluble urns do, the ice urn will dissolve as it floats on the water. By floating until completely dissolved, the ice urn allows time for a longer funerary ceremony. The length of time each urn takes to sink depends on the shape of the urn, the weight of cremated remains, and the water and air conditions. For example, dissolving time of the ice urn, in a preferred shape, is between 1 to 3 hours in a lake at an average temperature of 15° C. In any case, the ice urn usually dissolves more rapidly than other solid materials.

vi) The ice urn may be placed in the water in multiple ways, for example from a boat or from the water edge. The ice urn may also be placed on the ground.

vi) In other implementations, for alternate ceremonial scenarios, the urn can be designed to sink instead of float in water

Environmental Characteristics of the Ice Urn

The present invention also relates to a method of making a sustainable water-dissolvable urn by transforming a fluid, preferably water, into solid shape of ice encapsulating the ashes. With the ice urn, cremation ashes may be scattered over water or on the ground without doing any damage to the environment. Also, the method of making the ice urn is a low-energy consumption process.

The method offers the following characteristics:

i) The use of a clean fluid, preferably water, as the primary material minimizes significantly potential contamination of water or soil.

ii) Water is readily available and, as such, represents a resource that needs substantially less energy to be produced than existing biomaterials used for making urns. Water does not need to be stored or transported to a manufacturing plant like existing biomaterials used for making urns.

iii) Although there are no available life cycle analysis (LCA) providing data on waste emissions and potential for causing environmental harm between biomaterials used for making water-soluble urns, water shows clearly a low footprint in comparison to any other produced material.

iv) The method of making the ice urn may use one or more moulds to be placed in an energy-efficient freezer.

v) Ice urns are not produced in advance, but rather on demand. As such, the process eliminates the use of large storeroom freezer for storing the urns.

Examples of Method of Making a Memorial Object or Ice Urn

The invention also relates to a method of making an ice urn including the steps of making an open ice urn in a mould; placing the ashes in a loose form or a frozen form on the bottom of the urn mould and; completing the ice urn by adding and freezing water into a final predetermined closed shape in which the ashes will be entrapped.

Figure 1A:
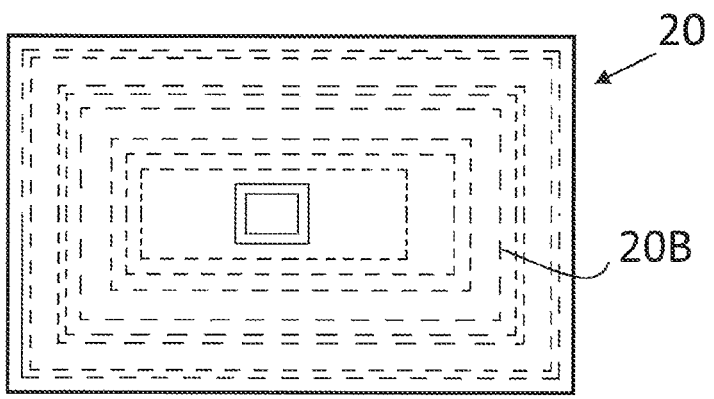
FIG. 1A is a top schematic view of a first portion of a two-part urn mould according to an embodiment of the present invention.
Figure 1B:
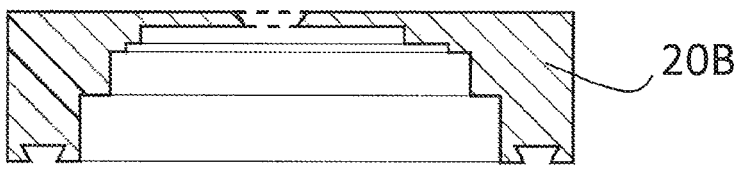
FIG. 1B is a side schematic view of the first portion of the two-part urn mould shown in FIG. 1A.
Figure 1C:
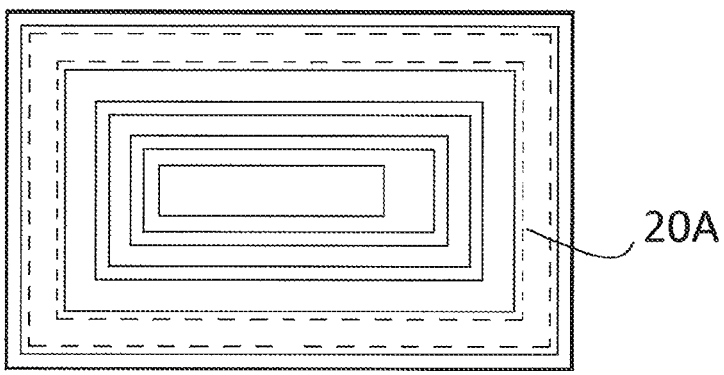
FIG. 1C is a top schematic view of a second portion of a two-part urn mould according to an embodiment of the present invention.
Figure 1D:
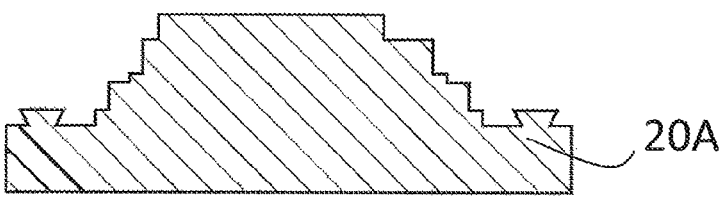
FIG. 1D is a side schematic view of the second portion of the two-part urn mould shown in FIG. 1C.
Figure 2:
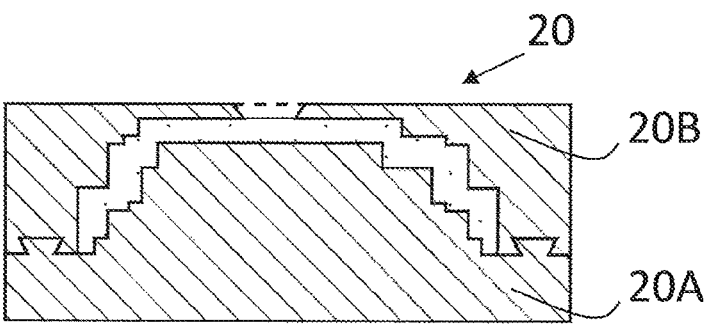
FIG. 2 is a side cut schematic view of the assembled two-part urn mould shown in FIGS. 1A-1D with a liquid poured therein.
Figure 3:
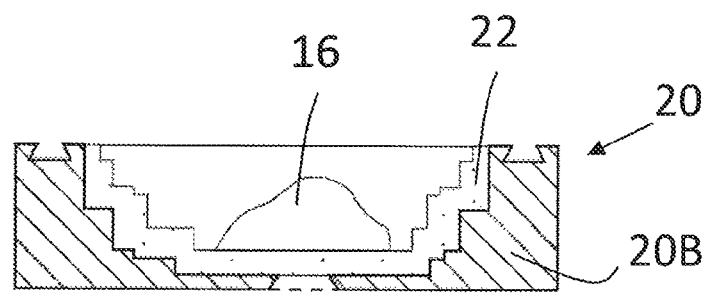
FIG. 3 is a side cut schematic view of part B of the mould shown in FIG. 2 with loose ashes deposited therein.
Figure 4:
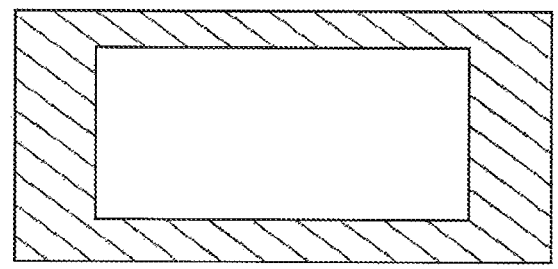
FIG. 4 is a top schematic view of an ice cover mould according to an embodiment of the present invention.
Figure 5:
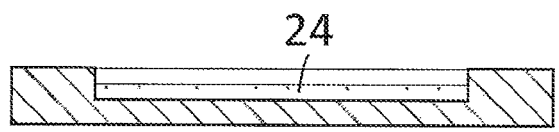
FIG. 5 is a side cut schematic view of the ice cover mould shown in FIG. 4.
Figure 6:
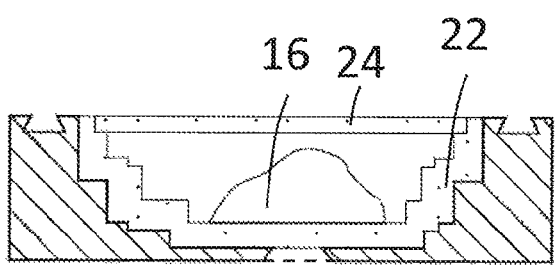
FIG. 6 is a side cut schematic view of part B of the mould shown in FIG. 3 with an ice cover placed thereon.

In an embodiment (see method 1, FIGS. 1 to 16), to reduce the thickness of the walls of the ice urn, the urn mould 20 is made in two parts 20A,20B. This process allows for the urn to freeze more rapidly, and dissolve in the water or on the ground more rapidly, thus liberating the ashes more rapidly in the water. In this embodiment, the method for making the memorial object or ice urn comprises the steps of:

i) Pouring liquid in the two-part urn mould 20 (FIG. 2).

ii) Placing the urn mould 20 in the freezer for a period until the mould 20 is completely frozen to create, for example, an ice urn 22.

iii) Placing the loose ashes 16 inside the ice urn 22 (FIG. 3).

iv) Forming an ice cover 24 (FIG. 5)

v) Placing the ice cover 24 over the ice urn 22 (FIG. 6).

v) Placing the urn mould 20B in the freezer for a period until the urn mould 20B is completely frozen to solidify and complete the final shape of the memorial object 10 or ice urn (FIG. 8).

In another embodiment of the above-described method, once the ashes 16 are deposited in the ice urn 22, water can be added to the ashes 16 to form a mixture 18. The mixture 18 in the ice urn 22 is then covered with the ice cover 24 as shown in FIG. 7.

Figure 9A:
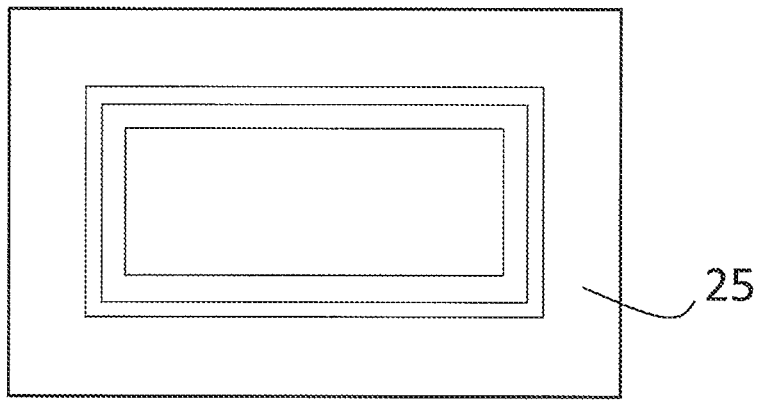
FIG. 9A is a top schematic view of a cover mould according to an embodiment of the present invention.
Figure 9B:
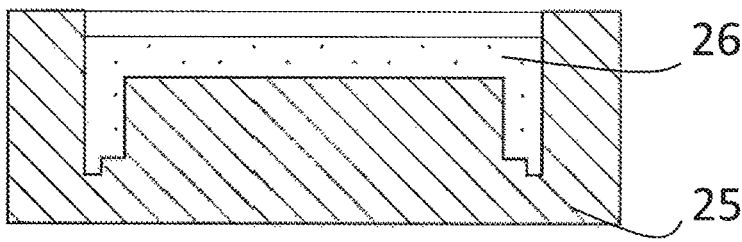
FIG. 9B is a side schematic view of the cover mould shown in FIG. 9A.
Figure 10A:
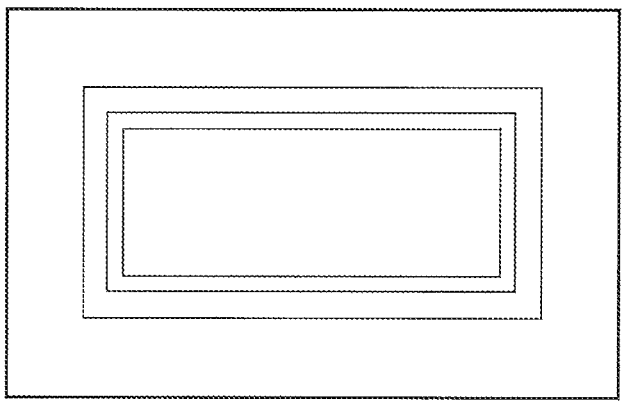
FIG. 10A is a top schematic view of a base mould according to an embodiment of the present invention.
Figure 10B:
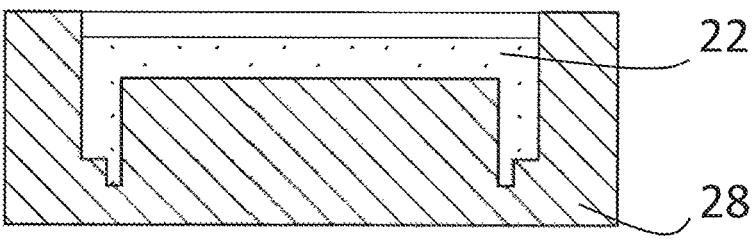
FIG. 10B is a side schematic view of the base mould shown in FIG. 10A.
Figure 11A:
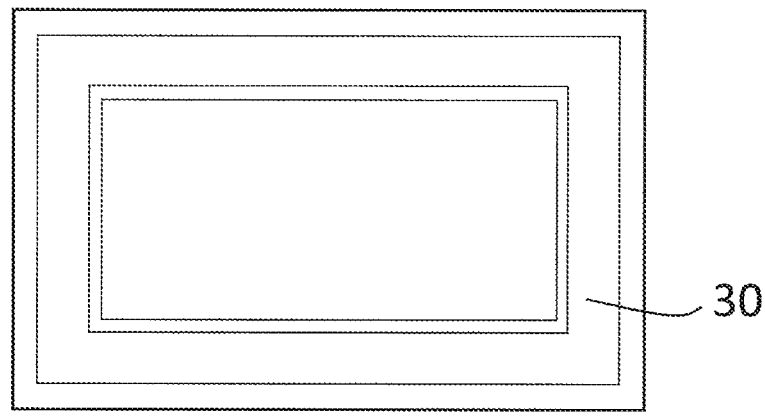
FIG. 11A is a is a top schematic view of an assembly mould according to an embodiment of the present invention.
Figure 11B:
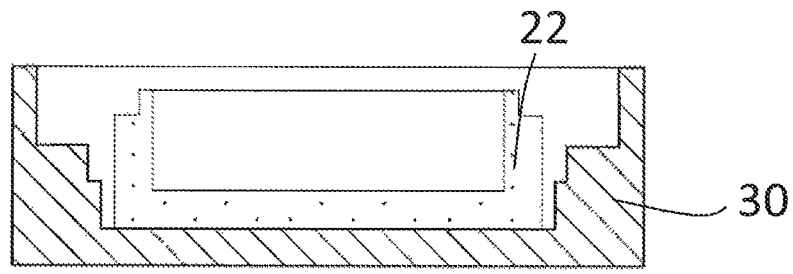
FIG. 11B is a side schematic view of the assembly mould shown in FIG. 11A with an ice base inserted therein.
Figure 12:
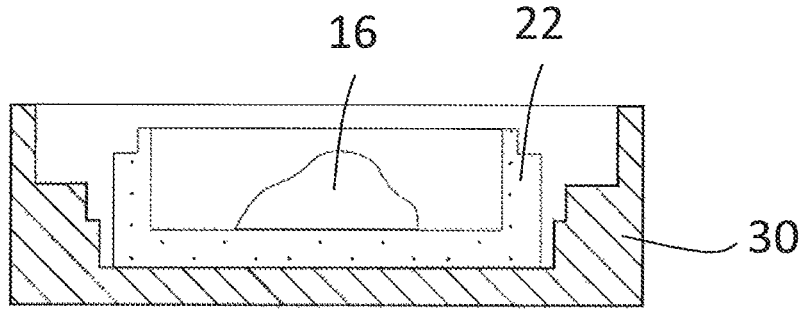
FIG. 12 is a side schematic view of the assembly mould shown in FIG. 11B with ashes deposited in the ice base.
Figure 13:
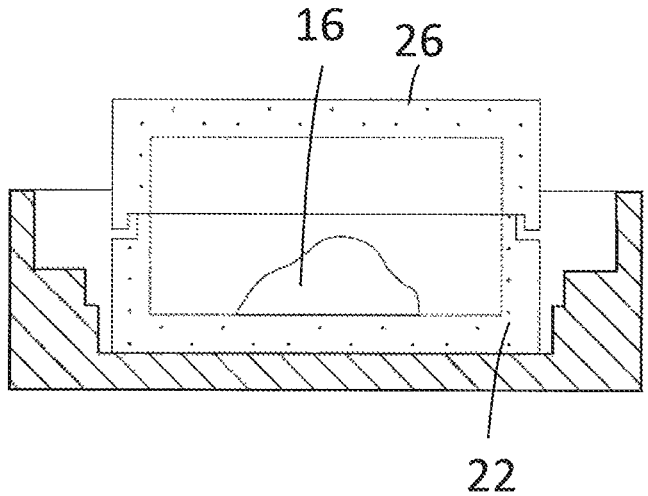
FIG. 13 is a side schematic view of the assembly mould shown in FIG. 12 with an ice cover positioned over the ice base.
Figure 14:
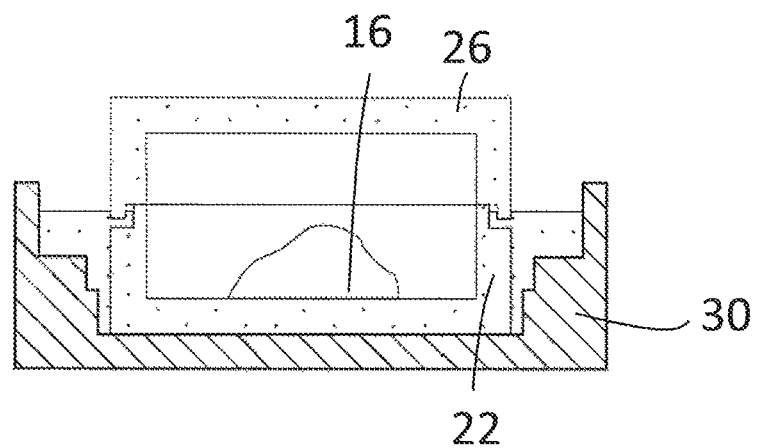
FIG. 14 is a side schematic view of the assembly mould shown in FIG. 13 with a liquid poured therein to cover a joint between the ice cover and ice base.

In another embodiment of this first method (option B, FIGS. 9A to 16), a cover mould 25 is used to form a differently-shaped ice cover 26 (see FIG. 9B). A base mould 28 is used to form a differently-shaped urn 22 (see FIG. 10B). The ice urn 22 is then placed into an assembly mould 30. Ashes 16 are placed inside the ice urn 22 (FIG. 12). The ice cover 26 can then be placed over the ice base 22. Water can then be poured over the joint between the ice cover 26 and the ice base 22 (FIG. 14) to form a frozen water joint 32 as shown in FIG. 15. The assembly urn 30 can be placed in a freezer to solidify and complete the final shape of the memorial object 10 or urn.

In the above methods, the internal cavity of the memorial object 10, where the ashes 16 or mixture 18 are stored, is shaped and sized such that the memorial object 10 initially floats when inserted in water, and thus accommodates a weight of ashes between 2.5 kg and 6 kg.

In another implementation, two sets of moulds are used. One is for solidifying the ashes by way of mixing them with water and freezing them in a predetermined shape. The second set of mould is used for making the ice urn in which the frozen ashes will be entrapped. In other implementations, the ashes can be left in loose form and placed within the ice urn.

Figure 17:
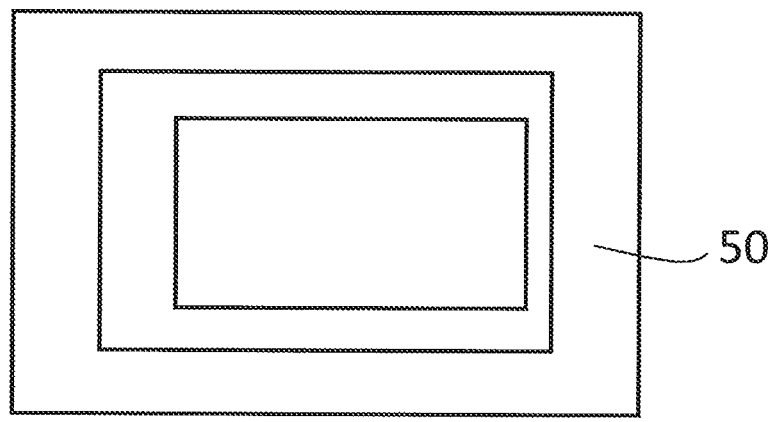
FIG. 17 is a top schematic view of a cremation ash mould according to an embodiment of the present invention.
Figure 18:
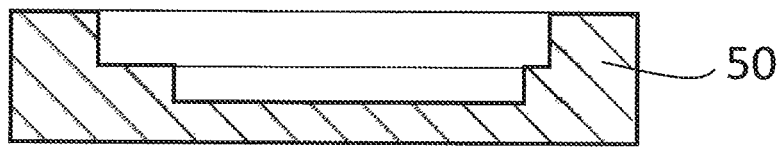
FIG. 18 is a side cut schematic view of a cremation ash mould according to an embodiment of the present invention.
Figure 19:
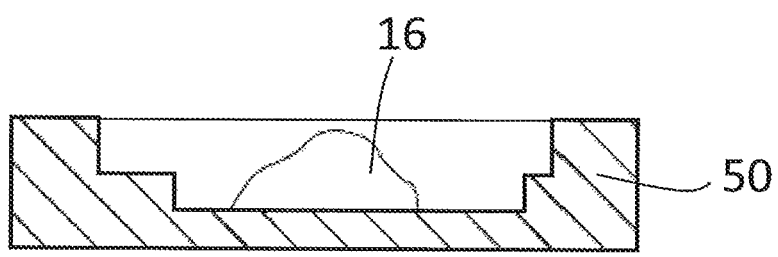
FIG. 19 is a side cut schematic view of a cremation ash mould according to an embodiment of the present invention with cremation ash deposited therein.

In this embodiment, the method for making an ice urn comprises the steps of:

i) Depositing the ashes 16 in a mould 50 (FIGS. 17-19).

ii) Pouring water into the mould 50 and mixing ashes with water (FIG. 20).

iii) Placing mould 50 in a freezer for a period until the mould 50 is completely frozen to solidify the ash and water mixture to form a predetermined shape 18.

iv) Making the ice urn by pouring liquid in the two-part the urn mould 20 (FIGS. 21A-22).

v) Placing the urn mould 20 in a freezer for a period until the urn mould 20 is completely frozen.

vi) Placing the predetermined shape 18 of frozen ashes in the ice urn (FIG. 23) to complete the final shape of the memorial object 10 or ice urn (FIG. 24).

In another embodiment, the process is a simpler process. The ashes may be mixed with water directly in an urn mould and placed in the freezer to solidify and create the final shape of the memorial object 10 or ice urn.

Of course, numerous modifications could be made to the above-described embodiments without departing from the scope of the invention, as defined in the appended claims.

The invention claimed is:

1. A memorial object comprising:
   inner cremation contents; and
   a housing structure for housing the inner cremation contents, the housing structure being made of at least a first fluid,
   wherein the housing structure is maintained in a predetermined solid shape only by maintaining the housing structure under a freezing temperature of the first fluid.

2. The memorial object as claimed in claim 1, wherein the inner cremation contents comprise cremation ash.

3. The memorial object as claimed in claim 2, wherein the first fluid comprises water.

4. The memorial object as claimed in claim 2, wherein the first fluid comprises a water-based liquid.

5. The memorial object as claimed in claim 1, wherein the inner cremation contents is a mixture comprising:
   cremation ash; and
   a second fluid;
   wherein the mixture is frozen into a second predetermined shape.

6. The memorial object as claimed in claim 5, wherein the second predetermined shape is integrally frozen with the first fluid to the housing structure.

7. The memorial object as claimed in claim 6, wherein the first fluid comprises water.

8. The memorial object as claimed in claim 6, wherein the first fluid comprises a water-based liquid.

9. The memorial object as claimed in claim 5, wherein the first fluid comprises water.

10. The memorial object as claimed in claim 5, wherein the first fluid comprises a water-based liquid.

11. The memorial object as claimed in claim 1, wherein the first fluid comprises water.

12. The memorial object as claimed in claim 1, wherein the first fluid comprises a water-based liquid.

13. A method of forming a memorial object, which comprises:

(a) pouring a first fluid in a first mould, said first mould being shaped in a first predetermined shape and receiving cremation contents;
(b) cooling the first fluid to at least a freezing temperature of the first fluid, such that the first fluid transitions to a solid and assumes the shape of the first predetermined shape, thus forming the memorial object; and
(c) maintaining the memorial object in said first predetermined solid shape by maintaining the memorial object under the freezing temperature of the first fluid.

14. The method of forming a memorial object as claimed in claim 13, further comprising, before step (a), the steps of:
  (i) mixing a second fluid with the cremation contents to form a first cremation mixture;
  (ii) pouring the first cremation mixture in a second mould to form a second predetermined shape;
  (iii) cooling the first cremation mixture to at least the freezing temperature of the first cremation mixture; and
  (iv) placing the frozen first cremation mixture in the first mould.

15. The method of forming a memorial object as claimed in claim 13, further comprising:
  (d) placing the cremation contents in the first mould;
  (e) pouring a second fluid over the cremation content in the first mould to form a second cremation mixture; and
  (f) cooling the second cremation mixture to at least the freezing temperature of the second cremation mixture.

16. A method of forming a memorial object as claimed in claim 15, further comprising:
  (g) pouring a third fluid over the second cremation mixture in the first mould; and
  (h) cooling the third fluid to at least the freezing temperature of the third fluid, wherein said third fluid is integrally frozen with the first fluid to the housing structure.

17. A method of forming a memorial object as claimed in claim 13, wherein the first mould comprises a two-part mould.

18. A method of forming a memorial object, which comprises:
  (a) placing cremation contents in a mould;
  (b) pouring a fluid over the cremation contents;
  (c) cooling the fluid to at least a freezing temperature of the fluid, such that the fluid transitions to a solid and assumes a predetermined shape, thus forming the memorial object;
  (d) maintaining the memorial object in said predetermined solid shape by maintaining the memorial object under the freezing temperature of the fluid.

* * * * *